(12) United States Patent
Childs et al.

(10) Patent No.: US 6,799,115 B1
(45) Date of Patent: Sep. 28, 2004

(54) SYSTEMS, FUNCTIONAL DATA, AND METHODS TO PACK N-DIMENSIONAL DATA IN A PDA

(75) Inventors: Michael E. Childs, Overland Park, KS (US); Darin J. Beesley, Overland Park, KS (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 10/269,399

(22) Filed: Oct. 11, 2002

Related U.S. Application Data

(63) Continuation-in-part of application No. 10/086,370, filed on Feb. 28, 2002.

(51) Int. Cl.[7] .................................................. G09G 5/00
(52) U.S. Cl. ..................... 701/200; 455/456; 345/204; 345/418; 348/333.1; 709/203
(58) Field of Search .............................. 701/201, 211, 701/200; 345/418, 208, 204, 173, 163, 762; 348/333.1; 709/203, 206, 221; 455/456; 707/200, 10; 340/994

(56) References Cited

U.S. PATENT DOCUMENTS

| | | | |
|---|---|---|---|
| 5,528,248 A | 6/1996 | Steiner et al. | 342/357.06 |
| 5,938,721 A | 8/1999 | Dussell et al. | 701/211 |
| 5,946,692 A | 8/1999 | Faloutsos et al. | 707/101 |
| 5,995,970 A | 11/1999 | Robinson | 707/101 |
| 6,182,010 B1 | 1/2001 | Berstis | 701/211 |
| 6,266,612 B1 | 7/2001 | Dussell et al. | 701/207 |
| 6,317,684 B1 | 11/2001 | Roeseler | 701/202 |
| 6,317,687 B1 | 11/2001 | Morimoto | 701/211 |
| 6,321,158 B1 | 11/2001 | DeLorme | 701/201 |
| 6,411,899 B2 | 6/2002 | Dussell et al. | 701/211 |
| 6,484,093 B1 | 11/2002 | Ito et al. | 701/211 |
| 6,535,743 B1 | 3/2003 | Kennedy, III et al. | 455/456 |
| 6,594,666 B1 | 7/2003 | Biswas et al. | 707/100 |
| 2003/0045998 A1 | 3/2003 | Medl | 701/207 |

OTHER PUBLICATIONS

"An Optical pathfinder for vehicles in real–world digital terrain maps", http://www. nease.net/jamsoft//shortestpath/pathfiner/4.html, (1999) 11 pages).

"Informed Search Methods", *Artificial Intelligence, A Modern Approach, Prentice–Hall, Inc.*, (1995), pp. 92–115.

"Real–Time Vehicle Routing in Dynamic and Stochastic Urban Traffic Networks", htttp://www.gpu.srv.ualberta.ca/lfu/research.htm, (1997), pp.1–3.

Ahuja, R., "Faster Algorithms for the Shortest Path Problem", *Journal of the Association for Computing Machinery 37(2)*, (1990),pp. 213–223.

Cung, V., et al., "An Efficient Implementation of Parallel A*", *CFPAR*, Montreal, Canada,(1994),pp. 153–167.

Fredman, M., "Fibonacci heaps and their uses in improved network optimization algorithms", *Journal of ACM*, (1987),2 pages.

Fu, L., "Heuristic Shortest Path Algorithms and their Potential IVHS Applications", *Proceedings of the 4th UNiversity of Alberta—University of Calgary, Joint Graduate Student Symposium in Transportation Engineering*, (1995),pp. 83–109.

(List continued on next page.)

*Primary Examiner*—Thomas C. Black
*Assistant Examiner*—Tuan C To
(74) *Attorney, Agent, or Firm*—Devon A. Rolf

(57) ABSTRACT

Devices, systems, functional data and methods are provided for packing n-dimensional data. The navigational device with n-dimensional data packing capabilities includes a processor communicating with a memory. Packing n-dimensional data within one or more coordinate data. Each coordinate data includes n-dimensional data and a control data. The control data are operable to determine which n-dimensional data are active within the coordinate data. Furthermore, each coordinate data are compressed or packed.

25 Claims, 10 Drawing Sheets

OTHER PUBLICATIONS

Ikeda, T., "A Fast Algorithm for Finding Better Routes by AI Search Techniques", *Vehicle Navigation and Information Systems Conference Proceedings*, (1994),pp. 291–296.

Kaindl, H., "Memory–Bounded Bidirectional Search", *Proceedings of the 12th National Conference on Art*, AAAI Press, Seattle WA,(1994),pp. 1359–1364.

Laporte, G., "The Vehicle Routing Problem: An Overview of Exact and Approximate Algorithms", *European Journal of Operational Research, 59*, (1992),pp. 345–358.

Myers, B., "Data Structures of Best–First Search", http://www.4.ncsu.edu/jbmyers/dsai.htm, (1997),pp. 1–6.

Ronngren, R., et al., "Parallel and Sequential Priority Queue Algorithms", *ACM Transactions on Modeling and Computer Simulation*, (1997),pp. 168–172, 198,199.

Stout, B., "Smart Moves: Intelligent Pathfinding", *Gamasutra*, (1997),pp. 1–11.

Wai, Leong.H., et al., "Comparative Study of Shortest Path Algorithm for Transport Network", *USRP Report 2*, (1999), pp. 1–10.

Zhan, F., "Three Fastest Shortest Path Algorithms on Real Road Networks: Data Structures and Procedures", *Journal of Geographic Information and Decision Analysis*, (1997), 11 pages.

Zhao, Y., "An Adaptive Route–Guidance Algorithm for Intelligent Vehicle Highway Systems", *American Control Conference*, Boston, MA, (1991), pp. 2568–2573.

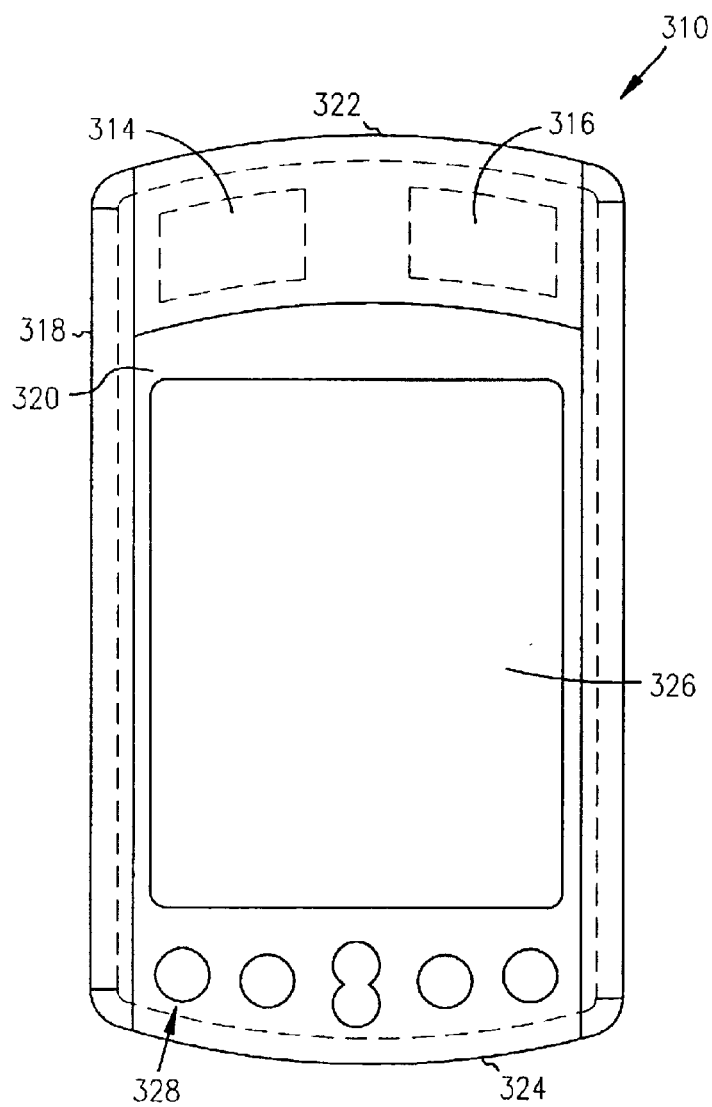
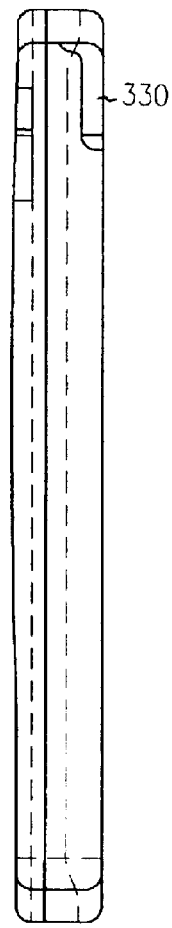
FIG. 3A      FIG. 3B
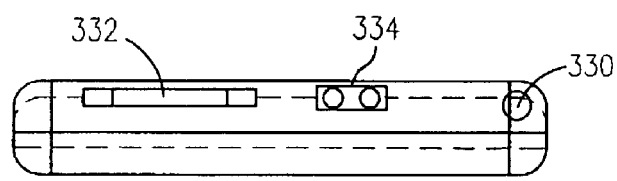
FIG. 3C

SYSTEMS, FUNCTIONAL DATA, AND METHODS TO PACK N-DIMENSIONAL DATA IN A PDA

CROSS-REFERENCE TO RELATED APPLICATIONS

This application is a continuation-in-part of U.S. application Ser. No. 10/086,370, filed Feb. 28, 2002, the specification of which is incorporated herein by reference.

FIELD OF THE INVENTION

The present invention relates generally to navigational systems and devices, and in particular to PDA systems and PDA devices having functional data, and methods to pack and unpack n-dimensional data associated with cartographic data.

BACKGROUND OF THE INVENTION

In a variety of applications, geographic features can be represented by coordinate sets and stored in computer data stores in the form of bits representing the coordinate information. The coordinate information often requires a large amount of storage space on the medium that is used to store it. This always presents a significant problem and becomes particularly undesirable when the storage medium has limited capacity that may not be sufficient to handle the data that must be stored.

The coordinate sets are included within cartographic data that is accessible to a navigational aid device. Further, the cartographic data is loaded into a memory of the device and manipulated to provide route planning and other features to a user of the device. Cartographic data includes, by way of example only, coordinate sets, thoroughfare identifications, intersection identifications, altitude information, depth information, landmark information, shoreline information, marine information, aeronautical information, longitude information, latitude information and the like. Cartographic data is voluminous and as a result, often only specific cartographic data associated with predefined geographic regions is loaded into the device during any particular operation cycle. Moreover, devices utilizing the cartographic data often have limited memory capacity and processing throughput. Accordingly, cartographic data is packed or compressed to achieve more efficient usage of limited memory resources.

In a variety of applications, geographic features are typically represented by coordinate sets and stored in data stores in the form of bits representing the coordinate information. The coordinate information often requires a large amount of storage space on the medium that is used to store it. This presents a significant problem and becomes particularly undesirable when the storage medium has limited storage capacity that may not be sufficient to handle the data that must be stored.

Polyline and polygon features can be represented by starting coordinate sets, each set representing a dimension within the cartographic data, and coordinate changes between successive coordinate sets. Generally, cartographic features vary widely in data size and shape, and some features have large changes in the coordinates while others have only small changes. It is not uncommon, especially with man-made structures, for a feature to have large ranging changes in one coordinate direction and only small changes in another direction. For example, roadways and grids of streets often follow north-south or east-west paths. Other features, both natural and man-made, exhibit similar characteristics.

Optimally packing coordinate set data has been established, such as Method and Apparatus for Geographic Coordinate Data Storage by Robinson et al., U.S. Pat. No. 5,995,970 ("Robinson") commonly assigned to the Garmin Corporation. Robinson is directed to packing coordinate data along two geographic dimensions associated with a coordinate set of x and y (e.g., longitude and latitude).

Furthermore, packing more than two dimensions to include a third dimension, which is directly associated with one of the two packed dimensions, can provide tremendous benefits. For example, consider a marine vehicle traveling along a marked waterway (e.g., a recommended route) and using a navigational device which includes packed cartographic data. The cartographic data represents the path of the recommended route using longitude and latitude coordinates (two dimensions). However, the marine vehicle can benefit by having cartographic data which also includes data identifying water depth (e.g., third dimension) along the recommended route and perhaps bottom conditions (e.g., four or more dimensions) along the recommended route. Therefore, not all cartographic data is used to represent only two dimensions. Accordingly, a need exists to pack more than two dimensions in cartographic data and a need exists to identify which dimensions need to be packed within the cartographic data.

In summary, current prior art systems do not efficiently pack or use cartographic data associated with three or more dimensions. As users demand navigational products with greater informational capabilities, the problem will continue to escalate. Additionally, present devices which do not pack cartographic data in more than two dimensions and which do not provide for the ability to activate and deactivate dimensions do not adequately provide the ability to add greater content to the cartographic data in a space efficient and user configurable manner.

Therefore, there exists a need for a navigational device that more efficiently configures, packs, and uses cartographic data having more than two dimensions. Moreover, there is also a need for a navigational device which can process and unpack cartographic data using only dimensions desired by a user of the navigation device.

SUMMARY OF THE INVENTION

The above mentioned problems of navigational devices are addressed by the present invention and will be understood by reading and studying the following specification. Systems, devices, functional data, and methods are provided to pack n-dimensional data. The systems, devices, functional data, and methods of the present invention offer a device having n-dimensional data packing and unpacking capabilities. The device is capable of efficiently and accurately packing and unpacking of n-dimensional data.

In one embodiment of the present invention, a method to pack three or more dimensions represented in cartographic data is provided wherein cartographic data is received having dimension control data operable to represent one or more coordinated data. Each coordinate data has three or more dimensional data. Further, the coordinate data and the control data are packed into the cartographic data where each dimensional data associated with each coordinate data are compressed into an optimal size. Additionally, one or more special data are used to represent at least one dimensional data having a length exceeding the optimal size for the at least one dimensional data permitting the coordinate data to be compressed into the optimal size.

In another embodiment of the present invention functional data to configure and use attribute data is provided including activation data operable to activate or deactivate one or more attributes associated with the attribute data. Moreover, the functional data includes packed data representing compressed activation data and compressed attribute data. Further, the functional data includes instruction data to decompress the activation data and the attribute data. Also, the instruction data decompresses the activation data by using the attribute data, which indicates whether one or more of the attributes are activated in the activation data.

These and other embodiments, aspects, advantages, and features of the present invention will be set forth in part in the description which follows, and in part will become apparent to those skilled in the art by reference to the following description of the invention and referenced drawings or by practice of the invention. The embodiments, aspects, advantages, and features of the invention are realized and attained by means of the instrumentalities, procedures, and combinations particularly pointed out in the appended claims.

BRIEF DESCRIPTION OF THE DRAWINGS

FIGS. 3A–3C illustrate views for another embodiment of an electronic navigational device according to the teachings of the present invention;

DETAILED DESCRIPTION OF THE INVENTION

In the following detailed description of the invention, reference is made to the accompanying drawings which form a part hereof, and in which is shown, by way of illustration, specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to navigational systems and devices having cartographic data packing capabilities.

One type of navigational system includes Global Positioning Systems (GPS). Such systems are known and have a variety of uses. In general, GPS is a satellite-based radio navigation system capable of determining continuous position, velocity, time, and in some instances directional information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometrical triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

Figure 1:
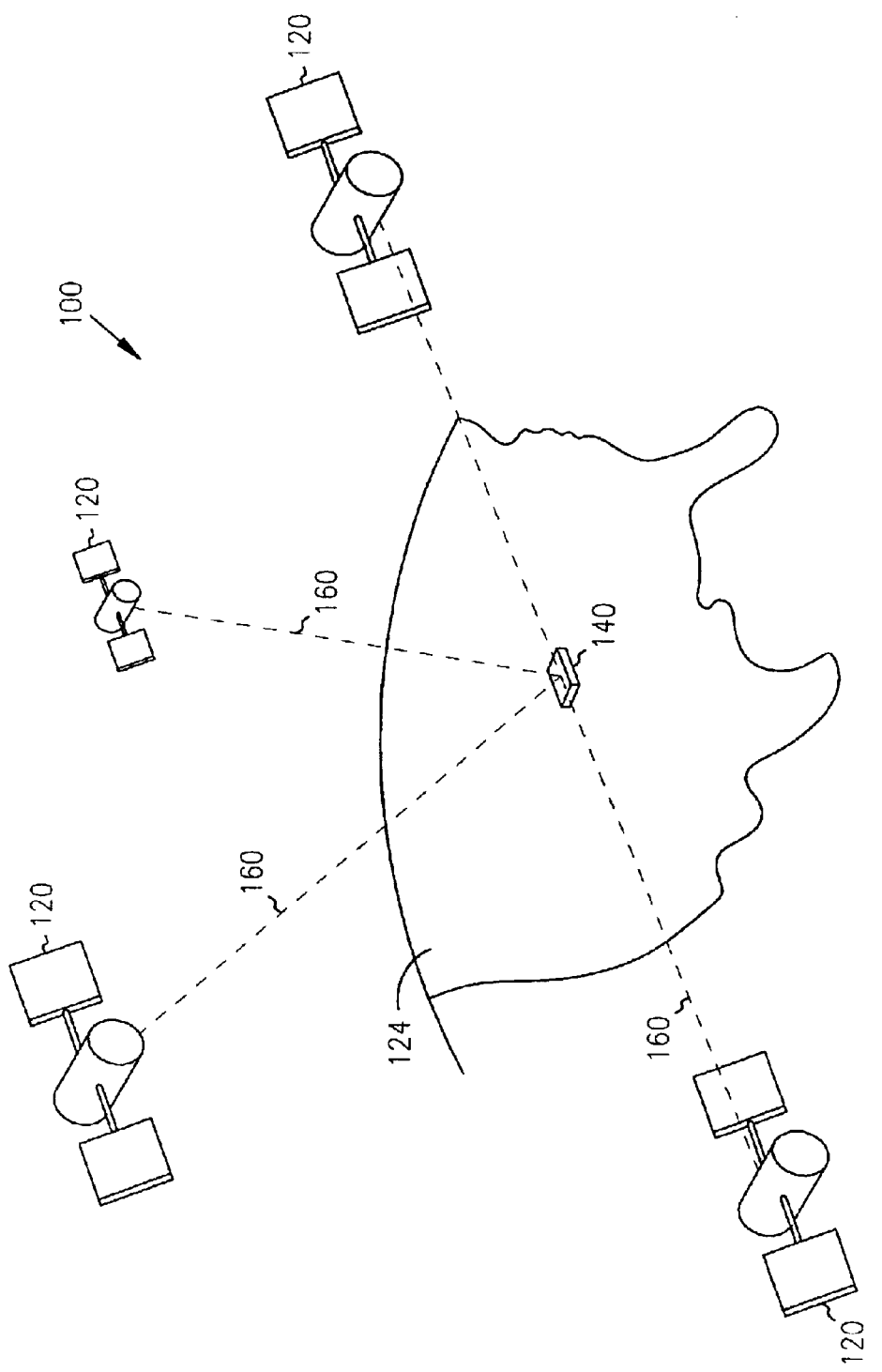
FIG. 1 is a representative view of a Global Positioning System (GPS)

FIG. 1 is representative of a GPS system denoted generally by reference numeral 100. A plurality of satellites 120 are in orbit about the Earth 124. The orbit of each satellite 120 is not necessarily synchronous with the orbits of other satellites 120 and, in fact, is likely asynchronous. A GPS receiver device 140 of the present invention is shown receiving spread spectrum GPS satellite signals 160 from the various satellites 120.

The spread spectrum signals 160 continuously transmitted from each satellite 120 utilizes a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

In fact, although GPS enabled devices are often used to describe navigational devices, it will be readily appreciated that satellites need not be used at all to determine a geographic position of a receiving unit, since cellular towers or any customized transmitting radio frequency towers can be deployed and combined in groups of three or more. With such a configuration, any standard geometric triangulation algorithm can be used to determine the exact location of the receiving unit. In this way, personal hand held devices, cell phones, intelligent appliances, intelligent apparel, and others can be readily located geographically, if appropriately equipped to be a receiving unit.

For example, at least three cellular towers can each transmit their location information to a receiving cellular phone, or any other receiving device, and if the phones or devices are equipped to perform the triangulation algorithm, then the location of the cellular phone or device can be readily resolved. By further way of example, an amusement park or entertainment facility can deploy three or more transmitting radio frequency devices and provide users with receiving units capable of performing a triangulation algorithm to determine the receiving units location within the amusement park or entertainment facility. In this way, it is readily apparent that a receiving unit need not be exclusively GPS enabled to benefit from the teachings of the present invention.

Figure 2A:
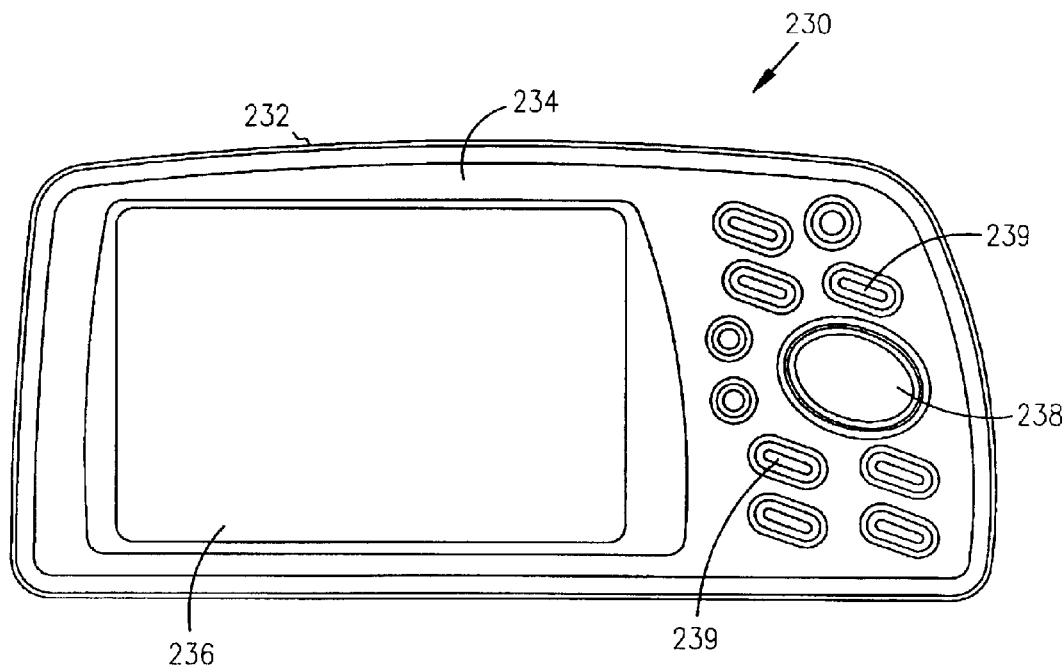
FIGS. 2A and 2B illustrate views for one embodiment of an electronic navigational device according to the teachings of the present invention.
Figure 2B:
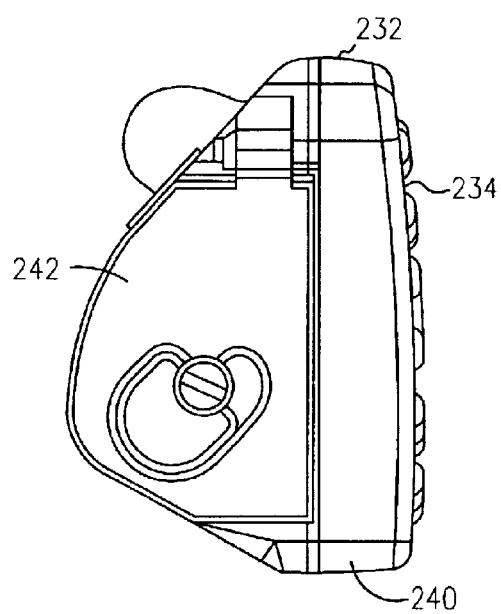

FIGS. 2A and 2B illustrate views for one embodiment of an electronic navigational device 230 according to the teachings of the present invention. As one of ordinary skill in the art will understand upon reading this disclosure, the device can be portable and can be utilized in any number of implementations such as automobile, personal marine craft, and avionic navigation. In the embodiment of FIG. 2A a front view of the navigational device 230 is provided showing the navigational device has a generally rectangular housing 232. The housing 232 is constructed of resilient material and has been rounded for aesthetic and ergonomic purposes. As shown in FIG. 2A, the control face 234 has access slots for an input key pad 238, other individual keys 239, and a display screen 236. In one embodiment, the display screen 236 is a LCD display which is capable of displaying both text and graphical information. The invention, however, is not so limited.

Audio information can likewise be provided in one embodiment.

In FIG. 2B, a side view of the navigational device 230 is provided. FIG. 2B illustrates that the device's housing 232 is defined by an outer front case 240 and a rear case 242. As shown in FIG. 2B, the outer front case 240 is defined by the control face 234. In the embodiment shown in FIG. 2B, the outer front case 240 and the rear case 242 are made of one molded piece to form the device housing 232 and support input key pad 238, other individual keys 239, and display screen 236 in respective access slots shown in the control face 234 of FIG. 2A.

FIGS. 3A–3C illustrate views for another embodiment of an electronic navigational device 310 according to the teachings of the present invention. The navigational device 310 shown in FIGS. 3A–3C includes a personal digital assistant (PDA) with integrated GPS receiver and cellular transceiver according to the teachings of the present invention. The GPS integrated PDA operates with an operating system (OS) such as, for example, the well-known Palm or Pocket PC operating systems, or the lesser-used Linux OS. As shown in the top view of FIG. 3A, the GPS integrated PDA 310 includes an internal integrated GPS patch antenna 314 and a cellular transceiver 316 contained in a housing 318. The housing 318 is generally rectangular with a low profile and has a front face 320 extending from a 20 top end 322 to a bottom end 324. Mounted on front face 320 is a display screen 326, which is touch sensitive and responsive to a stylus 330 (shown stored in the side view of FIG. 3B) or a finger touch. FIGS. 3A–3C illustrate the stylus 330 nested within housing 318 for storage and convenient access in a conventional manner. The embodiment shown in FIG. 3A illustrates a number of control buttons, or input keys 328 positioned toward the bottom end 324. The invention, however, is not so limited and one of ordinary skill in the art will appreciate that the input keys 328 can be positioned toward the top end 322 or at any other suitable location. The end view of FIG. 3C illustrates a map data cartridge bay slot 332 and headphone jack 334 provided at the top end 322 of the housing 318. Again, the invention is not so limited and one of ordinary skill in the art will appreciate that a map data cartridge bay slot 332 and headphone jack 334 can be provided at the bottom end 324, separately at opposite ends, or at any other suitable location.

According to embodiments of the invention, the GPS integrated PDA 310 includes a calendar function and an address book function. In some embodiments the GPS integrated PDA 310 includes a to-do list function. In some embodiments the GPS integrated PDA 310 includes a graffiti function. In some embodiments the GPS integrated PDA 310 includes a date book function. In some embodiments the GPS integrated PDA 310 includes a calculator function. In some embodiments the GPS integrated PDA 310 includes a memo pad or note pad function.

It should be understood that the structure of GPS integrated PDA 310 is shown as illustrative of one type of integrated PDA navigation device. Other physical structures, such as a cellular telephone and a vehicle-mounted unit are contemplated within the scope of this invention.

FIGS. 2A–2B and 3A–3C are provided as illustrative examples of hardware components for a navigational device according to the teachings of the present invention. However, the invention is not limited to the configuration shown in FIGS. 2A–2B and 3A–3C. One of ordinary skill in the art will appreciate other suitable designs for a hardware device which can accommodate the present invention.

Figure 4A:
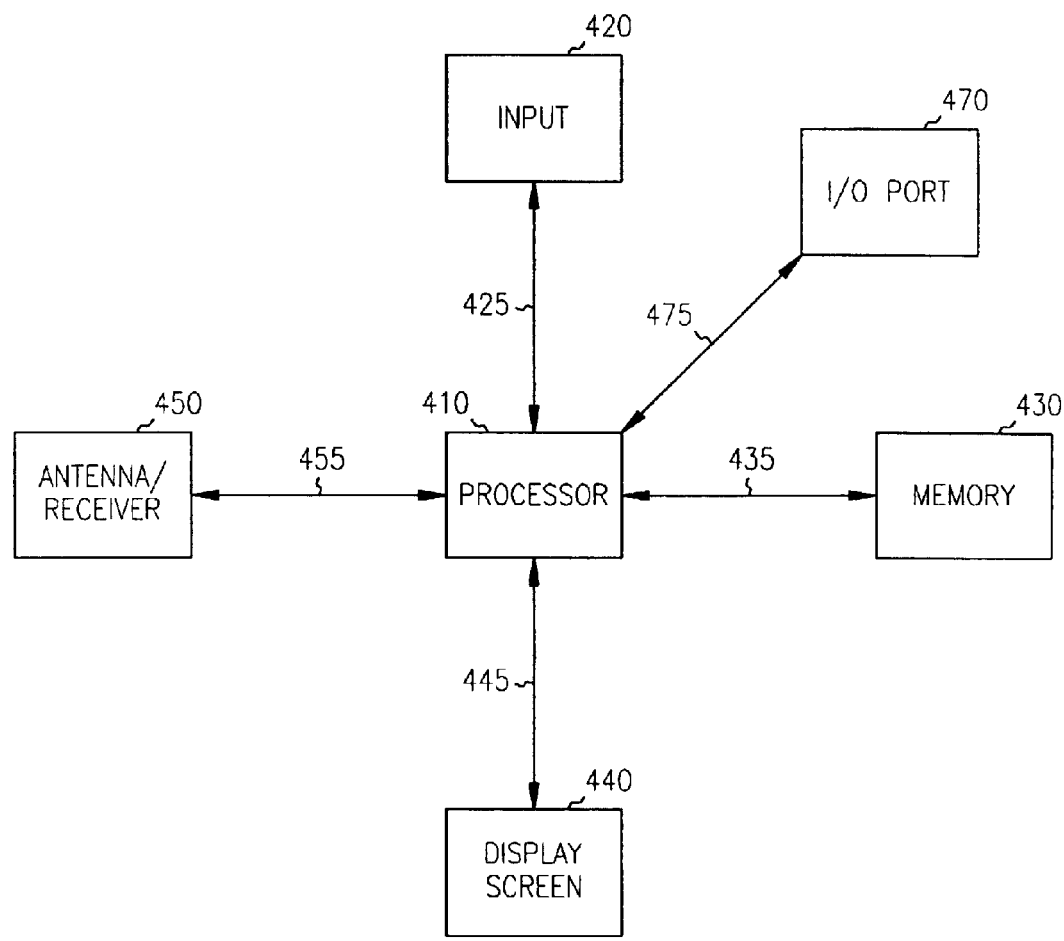
FIG. 4A is a block diagram of one embodiment for the electronic components within the hardware of FIGS. 2A–2B according to the teachings of the present invention.

FIG. 4A is a block diagram of one embodiment for the electronic components within the hardware of FIGS. 2A–2B, such as within housing 232 and utilized by the electronic navigational device. In the embodiment shown in FIG. 4A, the electronic components include a processor 410 which is connected to an input 420, such as keypad via line 425. It will be understood that input 420 may alternatively be a microphone for receiving voice commands. Processor 410 communicates with memory 430 via line 435. Processor 410 also communicates with display screen 440 via line 445. An antenna/receiver 450, such as a GPS antenna/receiver is connected to processor 410 via line 455. It will be understood that the antenna and receiver, designated by reference numeral 450, are combined schematically for illustration, but that the antenna and receiver may be separately located components, and that the antenna may be a GPS patch antenna or a helical antenna. The electronic components further include I/O ports 470 connected to processor 410 via line 475.

Figure 4B:
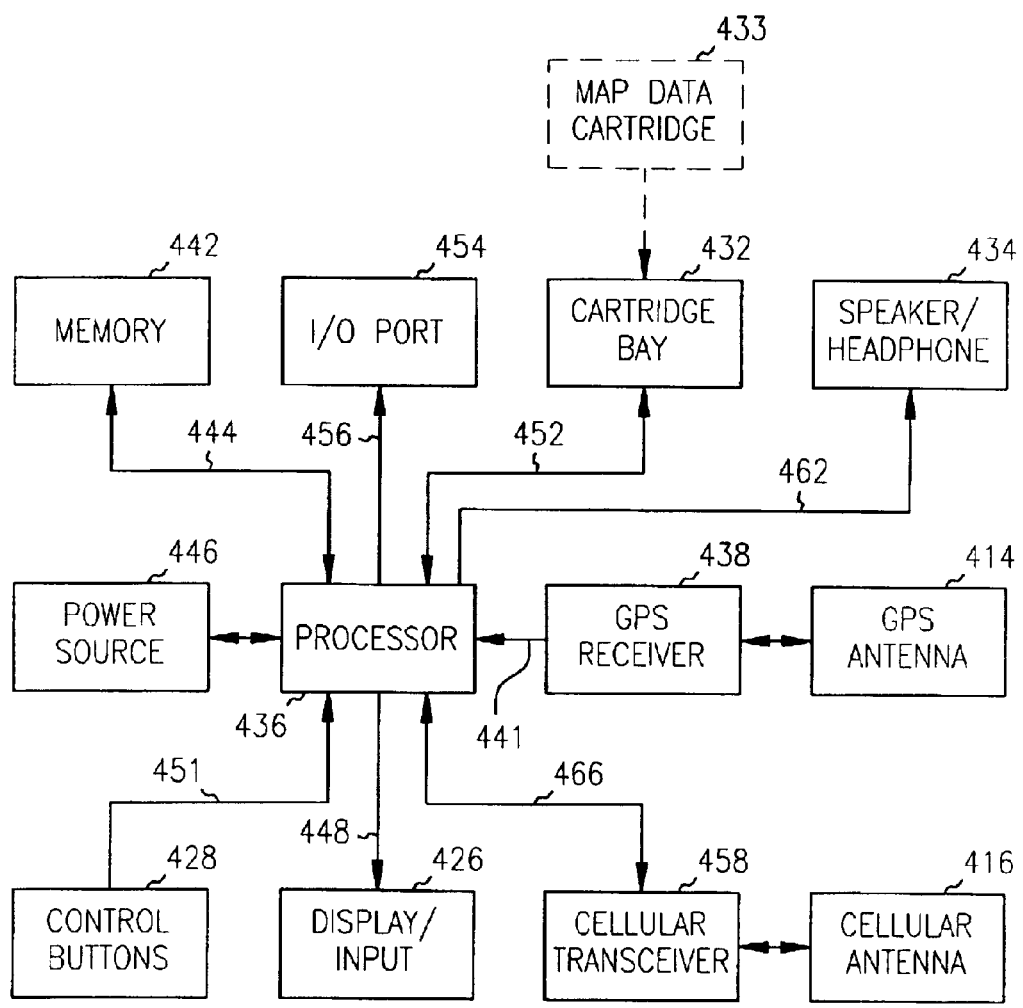
FIG. 4B is a block diagram of one embodiment for the electronic components within the hardware of FIGS. 3A–3C according to the teachings of the present invention.

FIG. 4B is a block diagram of one embodiment for the electronic components within the hardware of FIGS. 3A–3C and utilized by the GPS integrated PDA 310 according to the teachings of the present invention. The electronic components shown in FIG. 4B include a processor 436 which is connected to the GPS antenna 414 through GPS receiver 438 via line 441. The processor 436 interacts with an operating system (such as PalmOS; Pocket PC) that runs selected software depending on the intended use of the PDA 310. Processor 436 is coupled with memory 442 such as RAM via line 444, and power source 446 for powering the electronic components of PDA 310. The processor 436 communicates with touch sensitive display screen 426 via data line 448.

The electronic components further include two other input sources that are connected to the processor 436. Control buttons 428 are connected to processor 436 via line 451 and a map data cartridge 433 inserted into cartridge bay 432 is connected via line 452. A conventional serial I/O port 454 is connected to the processor 436 via line 456. Cellular antenna 416 is connected to cellular transceiver 458, which is connected to the processor 436 via line 466. Processor 436 is connected to the speaker/headphone jack 434 via line 462. The PDA 310 may also include an infrared port (not shown) coupled to the processor 436 that may be used to beam information from one PDA to another.

As will be understood by one of ordinary skill in the art, the electronic components shown in FIGS. 4A and 4B are powered by a power source in a conventional manner. As will be understood by one of ordinary skill in the art, different configurations of the components shown in FIGS. 4A and 4B are considered within the scope of the present invention. For example, in one embodiment, the components shown in FIGS. 4A and 4B are in communication with one another via wireless connections and the like. Thus, the scope of the navigation device of the present invention includes a portable electronic navigational aid device.

Moreover, it will be readily appreciated that the various electrical components shown in FIGS. 4A and 4B need not be physically connected to one another since wireless communication among the various depicted components is permissible and intended to fall within the scope of the present invention.

According to the teachings of the present invention, the electronic components embodied in FIGS. 4A and 4B are adapted to provide an electronic navigational aid device with efficient n-dimension data packing and unpacking. That is, according to the teachings of the present invention a processor 410 is provided with the electronic navigational aid device. A memory 430 is in communication with the processor 410. The memory 430 includes cartographic data having control data and one or more coordinate data. A display 440 is in communication with the processor 410, and the processor 410 is capable of packing and unpacking the cartographic data and generating a route within the cartographic data. The electronic navigational aid device processes device's travel along a generated route using a set of processing algorithms and cartographic data stored in memory 430 to operate on signals (e.g., GPS signals, received from the antenna/receiver 450 or any wireless signals), as the same will be known and understood by one of ordinary skill in the art upon reading this disclosure. The coordinate data is unpacked using the control data and mapped to a location on the route.

Figure 5:
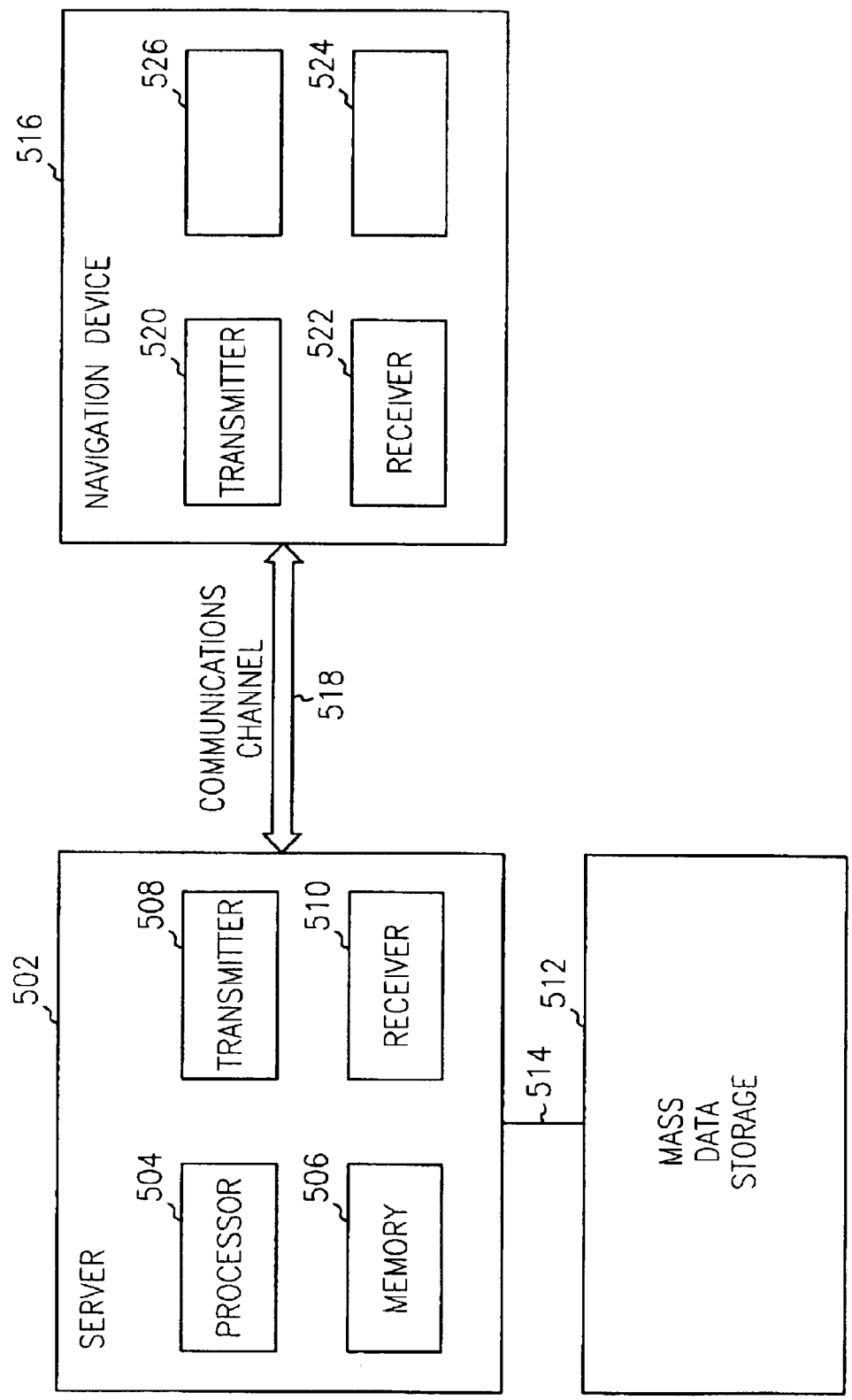
FIG. 5 is a block diagram of a navigation system according to the teachings of the present invention.

FIG. 5 is a block diagram of an embodiment of a navigation system which can be adapted to the teachings of the present invention. The navigation system includes a server 502. According to one embodiment, the server 502 includes a processor 504 operably coupled to memory 506, and further includes a transmitter 508 and a receiver 510 to send and receive data, communication, and/or other propagated signals. The transmitter 508 and receiver 510 are selected or designed according to the communication requirements and the communication technology used in the communication design for the navigation system. The functions of the transmitter 508 and the receiver 510 may be combined into a single transceiver.

The navigation system further includes a mass data storage 512 coupled to the server 502 via communication link 514. The mass data storage 512 contains a store of navigation data. One of ordinary skill in the art will understand, upon reading and comprehending this disclosure, that the mass data storage 512 can be separate device from the server 502 or can be incorporated into the server 502.

In one embodiment of the present invention, the navigation system further includes a navigation device 516 adapted to communicate with the server 502 through the communication channel 518. According to one embodiment, the navigation device 516 includes a processor and memory, as previously shown and described with respect to the block diagram of FIGS. 4A and 4B. Furthermore, the navigation device 516 includes a transmitter 520 and receiver 522 to send and receive communication signals through the communication channel 518. The transmitter 520 and receiver 522 are selected or designed according to the communication requirements and the communication technology used in the communication design for the navigation system. The functions of the transmitter 520 and receiver 522 may be combined into a single transceiver.

Software stored in the server memory 506 provides instructions for the processor 504 and allows the server 502 to provide services to the navigation device 516. One service provided by the server 502 involves processing requests from the navigation device 516 and transmitting navigation data from the mass data storage 512 to the navigation device 516. According to one embodiment, another service provided by the server 502 includes processing the navigation data using various algorithms for a desired application, and sending the results of these calculations to the navigation device 516.

The communication channel 518 is the propagating medium or path that connects the navigation device 516 and the server 502. According to one embodiment, both the server 502 and the navigation device 516 include a transmitter for transmitting data through the communication channel and a receiver for receiving data that has been transmitted through the communication channel.

The communication channel 518 is not limited to a particular communication technology. Additionally, the communication channel 518 is not limited to a single communication technology; that is, the channel 518 may include several communication links that use a variety of technology. For example, according to various embodiments, the communication channel is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, radio-frequency (RF) waveguides, the atmosphere, and empty space. Furthermore, according to various embodiments, the communication channel includes intermediate devices such as routers, repeaters, buffers, transmitters, and receivers, for example.

In one embodiment, for example, the communication channel 518 includes telephone and computer networks. Furthermore, in various embodiments, the communication channel 516 is capable of accommodating wireless communication such as radio frequency, microwave frequency and infrared communication, and the like. Additionally, according to various embodiments, the communication channel 516 accommodates satellite communication.

The communication signals transmitted through the communication channel 518 include such signals as may be required or desired for a given communication technology. For example, the signals may be adapted to be used in cellular communication technology, such as time division multiple access (TDMA), frequency division multiple access (FDMA), code division multiple access (CDMA), global system for mobile communications (GSM), and the like. Both digital and analog signals may be transmitted through the communication channel 518. According to various embodiments, these signals are modulated, encrypted and/or compressed signals as may be desirable for the communication technology.

The mass data storage includes sufficient memory for the desired navigation application. Examples of mass data storage include magnetic data storage media such as hard drives, optical data storage media such as CD ROMs, charge storing data storage media such as Flash memory, and molecular memory, such as now known or hereinafter developed.

According to one embodiment of the navigation system, the 502 server includes a remote server accessed by the navigation device 516 through a wireless channel. According to other embodiments of the navigation system, the server 502 includes a network server located on a local area network (LAN), wide area network (WAN), a virtual private network (VPN) and server farms.

According to another embodiment of the navigation system, the server 502 includes a personal computer such as a desktop or laptop computer. In one embodiment, the communication channel 518 is a cable connected between the personal computer and the navigation device. According to one embodiment, the communication channel 518 is a wireless connection between the personal computer and the navigation device 516.

FIG. 5 presents yet another embodiment for a collective set of electronic components adapted to the present invention. As one of ordinary skill in the art will understand upon reading and comprehending this disclosure, the navigation system of FIG. 5 is adapted to the present invention in a manner distinguishable from that described and explained in detail in connection with FIGS. 4A and 4B.

That is, the navigational system of FIG. 5 is likewise adapted to provide an electronic navigational aid device 516 with more efficient n-dimension data packing and unpacking. In this embodiment, the processor 504 in the server 502 is used to handle the bulk of the system's processing needs. And as one of ordinary skill in the art will understand the mass storage device 512 connected to the server can include volumes more cartographic and route data than that which is able to be maintained on the navigational device 516 itself. In this embodiment, the server 502 processes the majority of a user's travel along the route using a set of processing algorithms and the cartographic and route data stored in memory 512 and can operate on signals, e.g. GPS signals, originally received by the navigational device 516. Similar to the navigational device of FIGS. 4A and 4B, the navigation device 516 in the system of FIG. 5 is outfitted with a display 524 and GPS capabilities 526.

Figure 6:
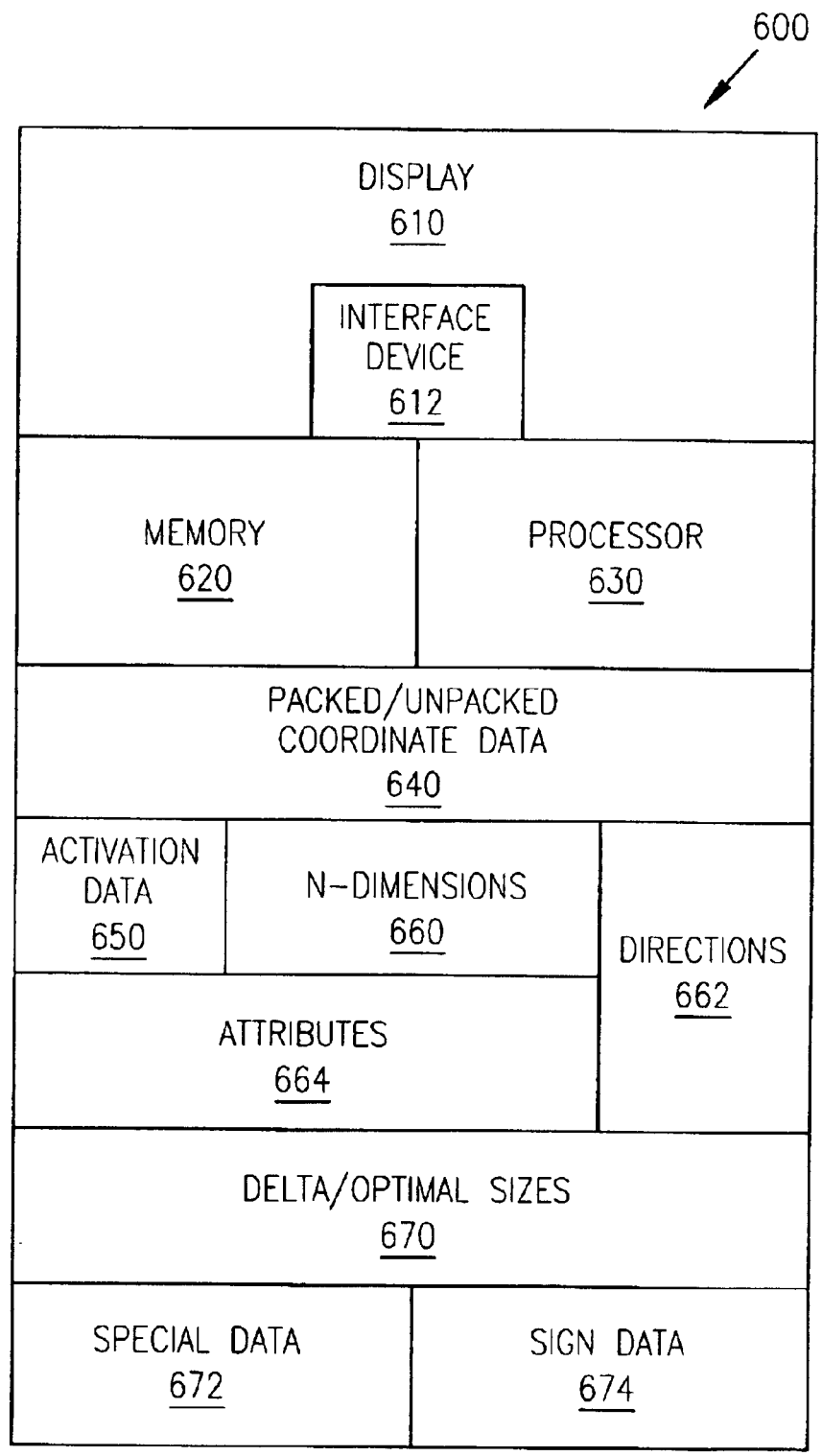
FIG. 6 is a navigational device according to the teachings of the present invention.

FIG. 6 shows a block diagram for one embodiment of a navigation device 600 according to the teachings of the present invention. The navigational device 600 includes a processor 630 and a memory 620 in communication with the processor 630. The device 630 uses the memory 620 in cooperation with the processor 630 to pack a plurality of coordinate data 640 and associate activation data 650 with each coordinate data 640 representing one or more dimensions 660 associated with each coordinate data 640. Furthermore, at least a portion of the coordinate data 640 is dynamically communicated to the display 610.

In one embodiment, the memory 620 in communication with the processor 630 receives cartographic data, including coordinate data 640. As previously presented coordinated data 640 include, in some embodiments, data, indicative of multiple dimensions associated with a line along a polygon, and the deltas ("coordinate changes") in each coordinate direction.

Each coordinate connects to another coordinate, with the delta changes of the coordinates, along the two dimensions between all intermediate coordinates, representing coordinate data 640. As previously presented, in some embodiments, the often voluminous data is efficiently packed into memory 620 by using techniques similar to Robinson, wherein the difference between the starting coordinate and the ending coordinate represent a size which is then optimized creating an optimal/delta size 670 for the coordinate data 640. If the length of the coordinate data 640 exceeds the optimized size 670, then special data 672 (e.g. escape sequences) is used to represent the actual data and compress or pack the coordinate data 640. Robinson (U.S. Pat. No. 5,995,970) is expressly incorporated by reference herein.

In some embodiments, if each dimension 660 (e.g., coordinate) within the coordinate data 640 moves in the same direction 662, then a single sign data 674 is used to represent global sign data 674 of each of the dimensions 660 within the coordinate data 640. Similarly, if three or more dimensions 660 or coordinates are associated with the coordinate data 640 then each of these additional dimensions 660 can be packed or compressed along each dimension 660, using compression techniques disclosed in Robinson, or any other commonly used compression technique.

As previously presented, dimensions 660 can include, by way of example, latitude information, longitude information, altitudinal information, depth information, shoreline information, marine information, aeronautical information, landmark information, and the like. Moreover, some dimensions 660, in some embodiments, include attribute data 664 relevant and useful to a particular dimension 660, or even a particular geographic feature along a particular dimension 660. Attribute data 664 can include, by way of example only, color data, texture data, and other feature data associated with all or part of a particular dimension 660. In fact, attribute data 664 in some embodiments are variants of dimensions 660.

The activation data 650 is parsed, such that each coordinate data 640 is identified with activated dimension data 660, thus resolving which dimensions 660 are in use. For example, coordinate data 640 associated with marine cartographic data can include one or more coordinate data 640. According to this example, each coordinate data 640 has four dimensions 660, namely longitude position, latitude position, bottom conditions, and water depth. The activation data 650 is a four bit string, wherein each bit is set to "1" with the location of each bit uniquely identifying one of the four dimensions 660. In this way, when the coordinate data 640 is packed or compressed in the memory 620, or unpacked or decompressed from the memory 620, the activation data 650 assists in only packing or unpacking dimensions 660 being used by device 600. Further, other configurations using the activation data 650 can be used to achieve the same result, all such other configurations are intended to fall within the broad scope of the present invention.

As one skilled in the art will appreciate, the device 600 of FIG. 6 optimizes the use of storage within the device 600 and permit the packing and the unpacking of n-dimensional data 660 associated with coordinate data 640. Accordingly, a single cartographic data in some embodiments is customized using various configurations of activation data 650 to derive appropriate packed/unpacked coordinate data 640. Furthermore, in other embodiments the processor 630 and the memory 620 cooperate to communicate with an interface device 612 which audibly or visually interfaces with the display 610 of the device 600.

As previously discussed a variety of configurations to device 600 can be made without departing from the scope of the present invention. For example, the device 600 can be permanently affixed to a transportation vehicle, detachably affixed to a transportation vehicle, a portable handheld device, an intelligent appliance, a computing device, an intelligent apparel worn by a person or animal, and the like. Moreover, the memory 620 can be remote from the processor 630. And, the device 600 can be equipped to transmit to a separate device the coordinate data 640. All of these configurations now known, or hereafter developed are intended to fall within the tenets of the present invention.

Figure 7:
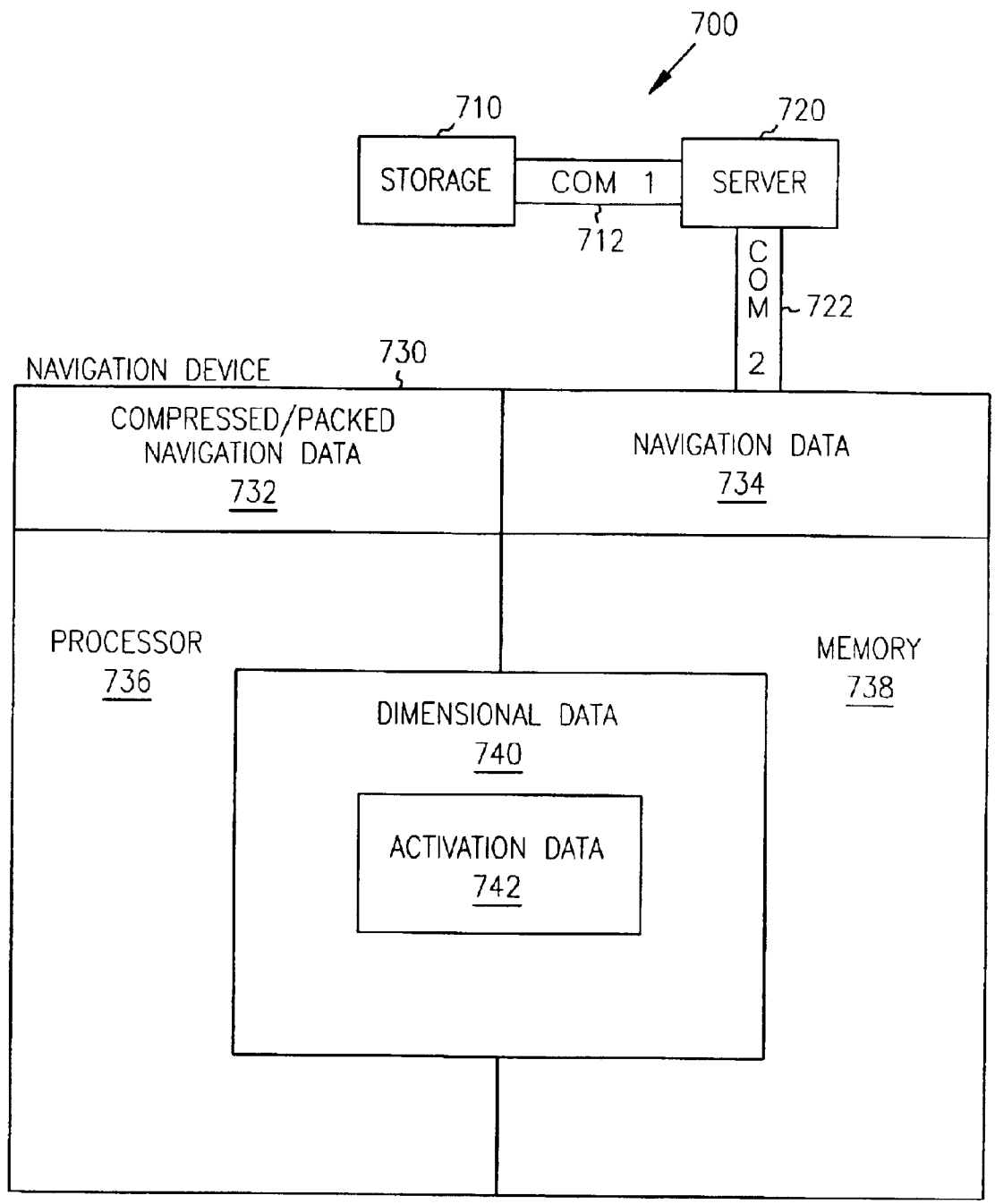
FIG. 7 is a diagram of one embodiment of a navigational system according to the teachings of the present invention.

FIG. 7 shows one diagram for one embodiment of a navigational system 700 according to the teachings of the present invention. The system 700 includes storage 710 adapted to store navigation data 734, a server 720 adapted to communicated with the storage 710 through a communications channel COM1 712, and a navigation device 730 through communications channel COM2 722.

The navigation device 730 further includes a processor 736 in communication with a memory 738 and is adapted to retrieve navigation data 734 from the server 720 though COM2 722. The navigation device's 730 processor 736 and memory 738 cooperate using a set of executable instructions. The processor 736 and memory 738 cooperate to pack and unpack 732 at least three dimensional data 740 associated with the navigation data 734 and activation data 742 associated with the at least three dimensional data 740.

In some embodiments the activation data 742 is configured to activate or deactivate dimensional data 740. As previously presented, activation data 742 can be configured as any data structure, such as a single bit associated with each dimension data 740 represented in the navigation data 734. Of course, any data structure which uniquely identifies each dimension data 740 and provides an indication to the memory 738 and the processor 736 as to which dimension data 740 to activate or deactivate within the compressed/packed navigation data 732 can be used to decompress/unpack navigation data 734.

The communication channels COM1 712 and COM2 722 need not be hardwired as any single wireless channel or combination of hardwired and wireless channels can be implemented without departing from the present invention. Further, although system 700 depicts compression capabilities of dimensional data 740 as being generated entirely within navigation device 730 as one skilled in the art will readily appreciate, this generation can occur in concert with the server 720. Moreover, server 720 can be a server in close proximity to navigation device 730 such that COM2 722 is achieved using infrared or radio frequency communications. Further, COM2 722 could be an Internet or peer-to-peer (P2P) connection between the server 720 and the navigation device 730. It is readily apparent that a variety of server/device configurations, now known or hereafter developed, are intended to fall within the scope of the present invention.

Figure 8:
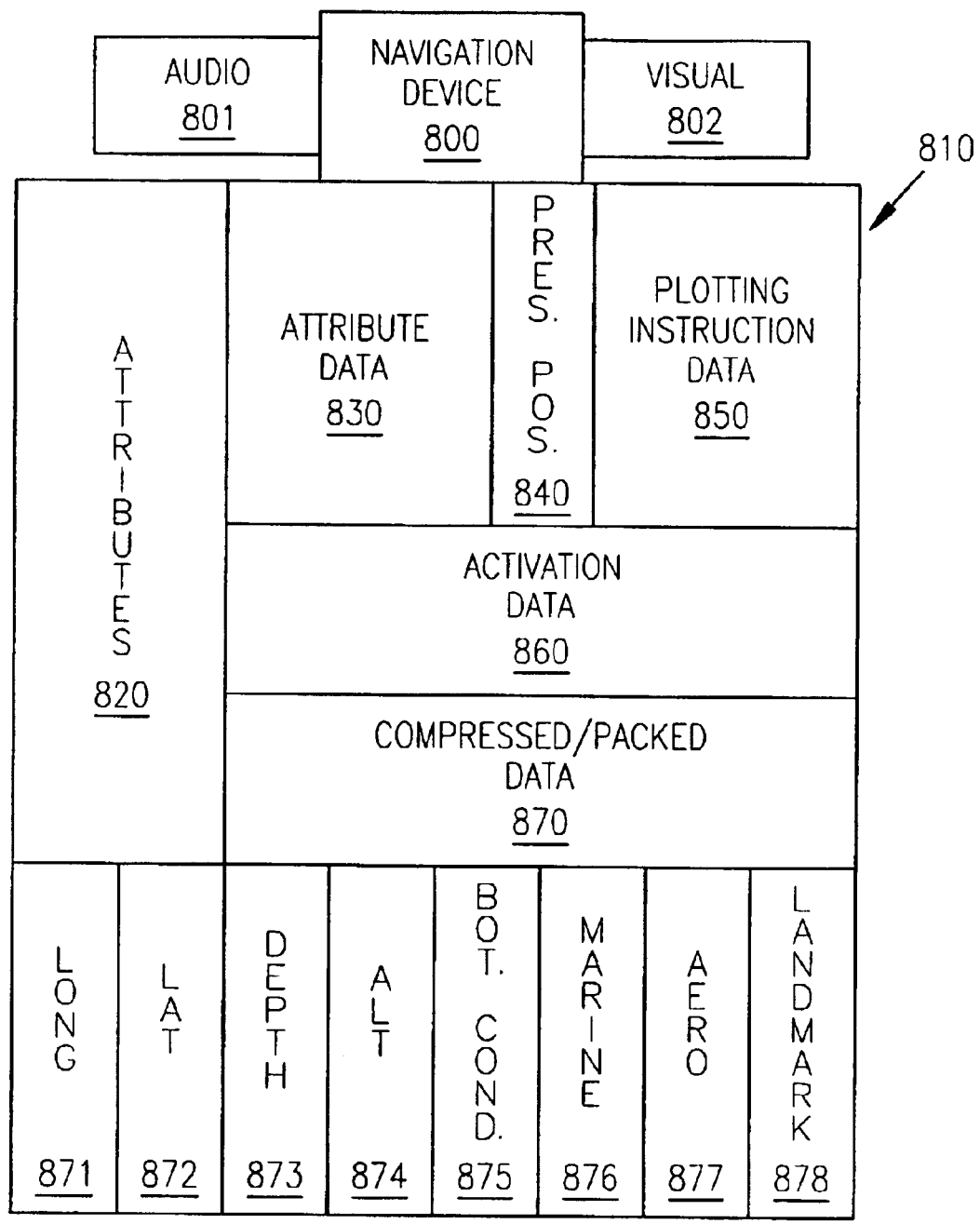
FIG. 8 is a block diagram of one embodiment of functional data according to the teachings of the present invention.

FIG. 8 shows one block diagram for one embodiment of functional data 810 according to the teachings of the present invention. The functional data 810 includes activation data 860 used to activate and deactivate attributes 820 associated with attribute data 830. The functional data 810 also includes packed data 870 representing compressed activation data 860 and compressed attribute data 830. Further instruction data 850 decompresses the activation data 860 and the attribute data 830.

As one skilled in the art will readily appreciate, the instruction data 850 can include any set of executable instructions operable to use the data structure representing the activation data 860. Further, the instruction data 880 can have any logic which understands the original compression or packed data 870 format, permitting the instruction data 850 to readily decompress the activation data 860 and the attribute data 830. For example, if the attribute data 830 and the activation data 860 were originally compressed using techniques similar to Robinson, discussed above, then the instruction data 850 is operable to translate packed special values into actual values for use by any navigation device utilizing the functional data 810 of FIG. 8.

Further, in some embodiments the activation data 860 represents at least three dimensions within the attribute data 830. The dimensions can include one or more data indicative of longitudinal data 871, latitudinal data 872, depth data 873, altitudinal data 874, bottom condition data 875, marine data 876, aeronautical data 877, landmark data 878, and others. Landmark data 878 can include information, by way of example only, representing or otherwise identifying buildings, architecture, monuments, historic locations, tourist locations, sport facilities, and the like.

Additionally, in some embodiments the functional data 810 includes plotting instruction data 850 interfaced to the instruction data 880. As one skilled in the art will appreciate, interfacing two sets of instruction data can be achieved with a variety of off-the-shelf or customized software packages. Further, the interfacing can occur through use of a common data store or data structure. The plotting instruction data 850 also plots the attribute data 830. The plotted attribute data is communicated to a navigation device 800 having an audio interface 801 and/or a visual interface 802.

Further, the functional data 810 can be configured to dynamically receive a present location data associated with the navigation device 800, such that a navigation system is used to determine the present position 840 of the navigation device 800. In this way, the present position 840 can be mapped and plotted relative to and within the attribute data 830.

As one skilled in the art will readily appreciate, the functional data 810 of FIG. 8 need not reside contiguously in a single computer readable memory, since the individual pieces of the functional data 810 may be distributed and logically associated to form or later be assembled or otherwise consumed to produce the functional data 800 of FIG. 8. Moreover, the instruction data 880, or any instruction data (e.g., plotting instruction data 850) need not reside on a navigation device 800, or any single computing environment, since multiple software programs and computing environments can be used to store or execute the instruction data depicted in FIG. 8 and all permutations and execution sequences are intended to fall within the broad scope of the present invention. Furthermore, not all of the functional data 810 need be processed on the navigational device 800, and navigational device 800 is depicted for purposes of illustration only and is not intended to be included as part of functional data 810. Further as is readily apparent, the present position 840 is updated and the instruction data 880 is dynamically executed repetitively to provide the ability to continually position the navigation device 800 relative to the compressed/packed data 870.

As one skilled in the art will appreciate, the functional data 810 of FIG. 8 permit a navigation device 800 to use the functional data 810 to optimally compress/pack and decompress/unpack attribute data 830 and activation data 860. Thus, less memory is used. Further, the activation data 860 is used to customize what attribute data 830 are useful to any such device or processor. In this way, the functional data 810 is customizable and thereby used to produce customized functional data 810 for a specific user desiring a device 800 and a memory using the customized functional data 810. Moreover, the functional data 810 can be used to efficiently unpack the compressed/packed data 870 as well.

Figure 9:
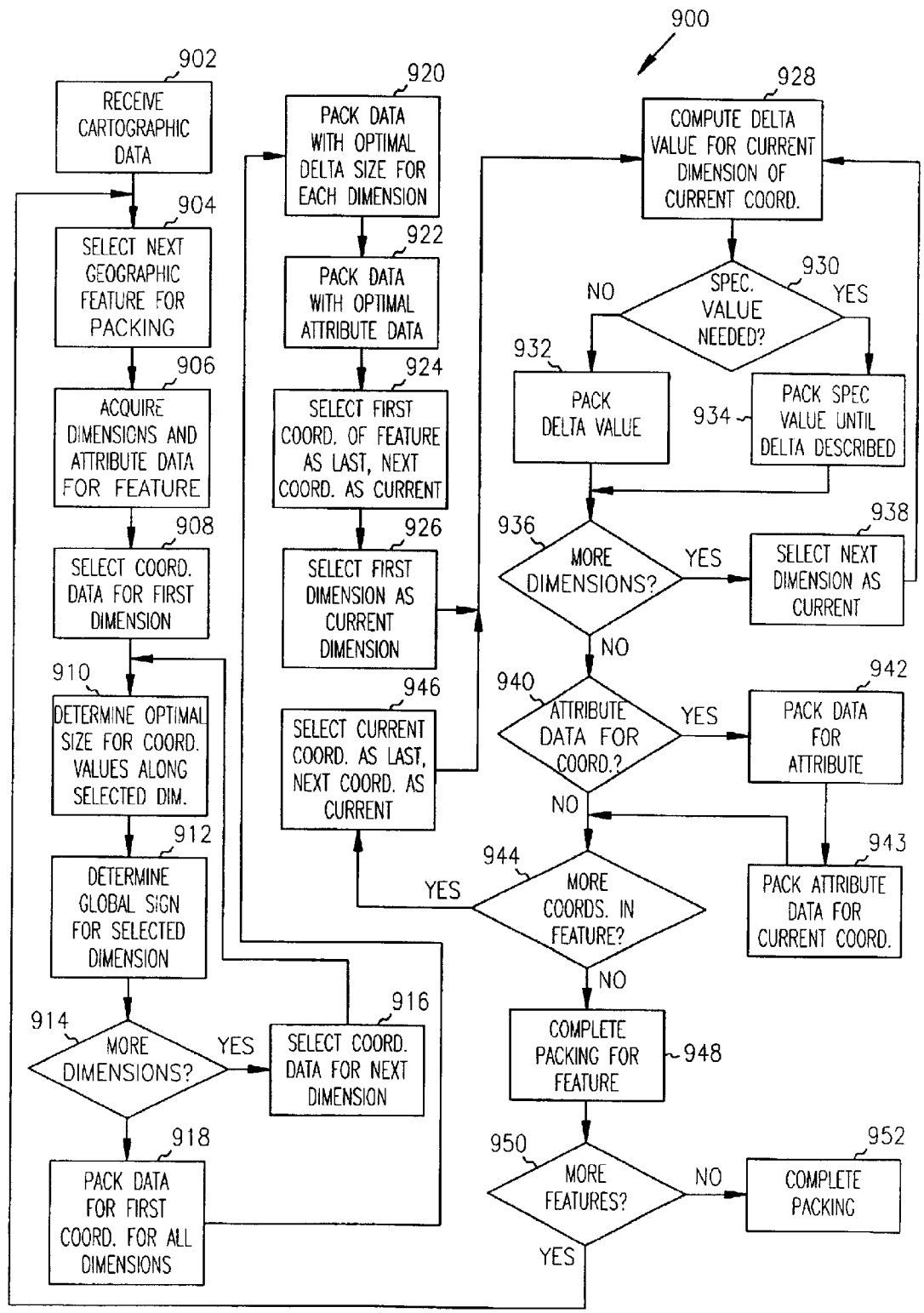
FIG. 9 is a flow diagram of one embodiment of a method to pack cartographic data according to the teachings of the present invention.

FIG. 9 shows one flow diagram for one embodiment of a method 900 to pack cartographic data according to the teachings of the present invention. However, as is readily apparent to one of ordinary skill in the art method 900 can be used to unpack cartographic data as well. Initially, cartographic data is received in block 902 along with control data. Acquisition of the control data occurs in some embodiments by parsing the cartographic data. In other embodiments, control data is included separate and apart from the cartographic data. As one skilled in the art will appreciate, all that is necessary is the ability to uniquely associate or otherwise map the control data with coordinate data represented within the cartographic data.

Next, in block 904 the control data is used to identify and select a geographic feature identified in the cartographic data. In some embodiments, a geographic feature is a particular waterway, a shoreline, a dock, and the like. In this way, the cartographic data can be used to represent multiple geographic features. In block 906, the control data is further used to acquire a first dimension associated with the selected geographic feature along with any attribute data associated with the dimension. Attribute data can be associated with one or more dimensions for the selected geographic feature. Moreover, attribute data, in some embodiments, is itself a dimension depending upon the perspective and representation embodied in the cartographic data. Attribute data is useful or desirable information associated with geographic features. In this way, and as previously presented, the dimensions and attributes include longitudinal data, latitudinal data, depth data, bottom condition data, altitudinal data, marine data, aeronautical data, landmark data, and the like.

In block 908, coordinate data for the first dimension is selected and in block 910 an optimal delta size, for all coordinate values represented along the first and a currently selected dimension, is determined. A global sign value is then determined in block 912 to identify the proper direction of the currently selected dimension. Next, in block 914 the control data is used to determine if more dimensions are represented for the selected geographic feature. Accordingly, if more dimensions are present then in block 916 coordinate data associated with the next dimension of the selected geographic feature is acquired from the cartographic data and method 900 proceeds to block 910 to repeat processing for the next identified dimension.

Once all dimensions have been processed to determine optimal delta sizes and global sign values for the first coordinate of each dimension, then the absolute value of the first coordinate for each dimension of the selected geographic feature is packed or otherwise recorded/retained in block 918. Next, in 920 the optimal delta sizes and sign values, associated with all of the dimensions of the selected geographic feature, are packed or otherwise recorded/ retained. Moreover, any identified attribute data that is identified as being distinct from the dimensions within the cartographic data are identified, packed or otherwise recorded/retained in block 922.

Next, in block 924 the initially selected first coordinate is identified as the last selected coordinate and the next coordinate is identified as a currently selected coordinate for processing. Accordingly, the first dimension, associated with the currently selected coordinate, is identified as a current processing dimension in block 926. And, in block 928 a computation is made to determine a delta value along the current dimension. The delta value is used to determine whether coordinate value variations occurring along the current processing dimension are such that a special value is required. A special delta value may be required if the delta value at this position is greater than the standard delta size selected in block 910. The special value allows a smaller standard delta size to be used, yet provides a mechanism to describe larger deltas as needed.

Accordingly, in block 930 a determination is made as to whether the current processing dimension requires or can otherwise benefit from the use of a special value. If no special value is required then in block 932, the current processing delta remains unchanged and the delta values for the current processing dimension are packed or otherwise recorded/retained. However, if a special value is required, the coordinate data along the current processing data is modified to include the special value and then packed or otherwise recorded/retained in block 934.

Next, a check is made in block 936 to determine if more dimensions are present, and if so in block 938 the next dimension is selected as the current dimension and processing resumes at block 928 to determine whether any special value may be required for the next and now current dimension. If no more dimensions are present then in block 940 a check is made to determine if any independent attribute data is present. If attribute data is present then the attribute data is packed or otherwise recorded/retained in block 942 and in block 943 all attribute data associated with the current coordinate is packed or otherwise recorded/retained.

In block 944 a check is made to determine if any more coordinates exist for the originally selected geographic feature, and if so in block 946 the currently selected coordinate is identified as the last selected coordinate and the next available coordinate is identified as the current processing coordinate and method 900 continues in block 946.

Once all coordinates and dimensions for the originally selected geographic feature are processed, then all coordinates, dimensions, and any associated attributes are packed or otherwise recorded/retained in block 948. Finally, a check is made in block 950 to determine if more geographic features exist within the cartographic data, and if so processing resumes for the next geographic feature in block 904. Once all geographic features are processed within the cartographic data, packing is completed in block 952.

Furthermore, method 900 can be used to decompress the packed or otherwise retained cartographic data by acquiring the delta sizes and any special values from the cartographic data during decompression. In this way, method 900 provides unique and novel techniques to optimize the packing and unpacking of cartographic data having three or more dimensions, which can also be optionally associated with multiple attribute data. Moreover, the attribute data can be associated with a single or multiple dimensions embodied within the cartographic data.

As one of ordinary skill in the art will understand upon reading this disclosure, the electronic components of device shown in FIGS. 4A and 4B and components of the system shown in FIG. 5 can be embodied as computer hardware circuitry or as a computer-readable program, or a combination of both. In another embodiment, the system of FIG. 5 is implemented in an application service provider (ASP) system.

With any computer-readable program embodiment for the present invention, the programs can be structured in an object-orientation using an object-oriented language such as Java, Smalltalk, C++, and others, and the programs can be structured in a procedural-orientation using a procedural language such as C, PASCAL, and others. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI).

It is readily appreciated by those skilled in the art that any programming methodology, programming language, programming interface, operating system, or computing environment, now known or hereafter developed can be readily deployed, without departing from the tenets of the present invention and all such implementation specific embodiments are intended to fall within the broad scope of the present invention.

Conclusion

The above systems, devices and methods have been described, by way of example and not by way of limitation, with respect to n-dimension data packing and unpacking capabilities, providing for more efficient memory management. That is, the systems, devices, functional data, and methods provide for a control data used to identify which data dimensions associated with coordinate data are to be packed and unpacked. The systems, devices, functional data, and methods of the present invention offer improved memory management and customized informational content to a user of a navigation device.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices, functional data, and methods are used. The scope of the invention should be determined with reference to the appended claims, along with the full scope of equivalents to which such claims are entitled.

What is claimed is:

1. A personal digital assistant (PDA), comprising:
   a calendar function;
   an address book function;
   a processor operable to communicate with a memory and a display;
   wherein the PDA uses the memory in cooperation with the processor to pack a plurality of coordinate data and associate at least a portion of activation data with each coordinate data, each coordinate data having three or more dimensions, and wherein the activation data indicates whether select ones of the three or more dimensions are activated and whether select ones of the three or more dimensions are deactivated; and
   wherein at least a portion of the coordinate data is dynamically communicated to the display.

2. The PDA of claim 1, further comprising an interface device operable to audibly communicate at least a portion of the coordinate data.

3. The PDA of claim 2, wherein at least one of the coordinate data exceed the delta size associated with packing the at least one coordinate data and wherein associating one or more special data ensures the at least one coordinate data are packed within the delta size associated with the coordinate data.

4. The PDA of claim 3, wherein:
   each dimension is associated with a direction; and
   if each direction within each dimension of each associated coordinate data proceeds in a same direction then using a single sign data for each dimension to pack each coordinate data.

5. The PDA of claim 1, wherein the PDA includes a telecommunication functionality operable for transmitting voice data.

6. The PDA of claim 1, wherein the PDA includes a Bluetooth capability.

7. A personal digital assistant (PDA), comprising:
   a calendar function;
   an address book function;
   a processor operable to communicate with a memory and a display;
   wherein the PDA uses the memory in cooperation with the processor to pack a plurality of coordinate data and associate at least a portion of activation data with each coordinate data, each coordinate data having three or more dimensions, and wherein each dimension includes a delta size associated with an optimal size to pack each coordinate data; and
   wherein at least a portion of the coordinate data is dynamically communicated to the display.

8. A personal digital assistant (PDA), comprising:
   a calendar function;
   an address book function;
   a processor operable to communicate with a memory and a display;
   wherein the PDA uses the memory in cooperation with the processor to pack a plurality of coordinate data and associate at least a portion of activation data with each coordinate data, each coordinate data having three or more dimensions, and wherein at least one of the dimensions is associated with attribute data relating to at least one of the other dimensions; and
   wherein at least a portion of the coordinate data is dynamically communicated to the display.

9. A PDA navigation system, comprising:
   a mass storage device adapted to store navigation data;
   a server adapted to communicate with the mass storage; and
   a PDA operable to communicate with and retrieve navigation data from the server via a communication channel, wherein the PDA includes a processor in communication with a memory, wherein the processor and memory cooperate to pack at least three dimensional data associated with the navigation data and activation data associated with the at least three dimensional data, and wherein each dimension includes a delta size that indicates an optimal size for packing the dimensional data.

10. The PDA navigation system of claim 9, wherein the communication channel includes a wireless channel.

11. A PDA navigation system, comprising:
   a mass storage device adapted to store navigation data;
   a server adapted to communicate with the mass storage; and
   a PDA operable to communicate with and retrieve navigation data from the server via a communication channel, wherein the PDA includes a processor in communication with a memory wherein the processor and memory cooperate to pack at least three dimensional data associated with the navigation data and activation data associated with the at least three dimensional data, and wherein the activation data are configurable to activate or deactivate each dimension within the at least three dimensional data of the navigation data.

12. The PDA navigation system of claim 11, wherein the navigation data are packed within the memory.

13. Functional data in a PDA to configure and use attribute data, comprising:

activation data operable to activate or deactivate one or more attributes associated with the attribute data;

packed data representing compressed activation data and compressed attribute data; and instruction data to decompress the activation data and the attribute data and using the attribute data based on whether one or more of the attributes are activated by the activation data.

14. The functional data of claim 13, wherein the activation data represents at least three dimensions included within the attribute data.

15. The functional data of claim 14, wherein the at least three dimensions include at least one of longitudinal data, latitudinal data, depth data, bottom condition data, attitudinal data, marine data, aeronautical data, and landmark data.

16. The functional data of claim 13, wherein at least a portion of the functional data is processed on the PDA.

17. The functional data of claim 13, further comprising plotting instruction data operable to interface with the instruction data and plot the attribute data.

18. The functional data of claim 17, wherein the plotting instruction data is further operable to communicate the plotted attribute data with at least one of an audio device and a visual device in the PDA.

19. The functional data of claim 13, further comprising present location data representing a present position of a PDA within the attribute data.

20. A method to pack three or more dimensions represented in cartographic data on a PDA, comprising:

in a PDA, receiving cartographic data including dimension control data operable to represent one or more coordinated data, each coordinate data having three or more dimensional data;

packing each coordinate data and the control data into the cartographic data wherein each dimensional data associated with each coordinate data are compressed into an optimal size; and using one or more special data to represent at least one dimensional data having a length exceeding the optimal size for the at least one dimensional data permitting the coordinate data to be compressed into the optimal size.

21. The method of claim 20, further comprising selectively decompressing the cartographic data having at least one of the dimensional data based on the dimension control data.

22. The method of claim 21, further comprising plotting the coordinate data.

23. The method of claim 22, wherein the at least three dimensional data represent at least one of longitudinal data, latitudinal data, depth data, bottom condition data, altitudinal data, marine data, aeronautical data, and landmark data.

24. The method of claim 20, wherein the method includes using a PDA having cell phone capabilities.

25. A personal digital assistant (PDA), comprising:

a calendar function;

an address book function;

a processor operable to communicate with a memory and a display;

means for packing a plurality of coordinate data and associating at least a portion of activation data with each coordinate data, each coordinate data having three or more dimensions, and wherein portions of the activation data activate a number of the dimensions and other portions of the activation data deactivate a number of the dimensions; and means for dynamically communicating at least a portion of the coordinate data to the display.

* * * * *